(12) United States Patent
Kruse et al.

(10) Patent No.: US 7,314,564 B2
(45) Date of Patent: Jan. 1, 2008

(54) METHOD FOR TREATING LIQUIDS

(75) Inventors: Charles E. Kruse, Roscoe, IL (US); Terry A. Johnson, Machesney Park, IL (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 0 days.

(21) Appl. No.: 11/546,513

(22) Filed: Oct. 11, 2006

(65) Prior Publication Data
US 2007/0075019 A1   Apr. 5, 2007

Related U.S. Application Data

(62) Division of application No. 11/225,385, filed on Sep. 13, 2005.

(60) Provisional application No. 60/609,423, filed on Sep. 13, 2004.

(51) Int. Cl.
*C02F 3/00*   (2006.01)
(52) U.S. Cl. ..................... 210/615; 210/620
(58) Field of Classification Search ............ 210/615, 210/620
See application file for complete search history.

(56) References Cited

U.S. PATENT DOCUMENTS 3,595,537 A   7/1971   Kaelin
5,750,041 A   5/1998   Hirane
6,110,389 A   8/2000   Horowitz
6,383,389 B1  5/2002   Pilgram et al.
6,666,965 B1  12/2003  Timmons

FOREIGN PATENT DOCUMENTS

WO   WO 03/041837 A1 *  5/2003

OTHER PUBLICATIONS

EURO-MATIC, "Hollow Plastic Balls for Industrial Applications," Sep. 10, 2004, (7 pgs), http://www.euro-matic.com/hollow.html.
USFILTER, "Aerator Products Aqua-Lator® High Speed Surface Aerators," 1999, pp. 2-15.
USFILTER, "Aerator Products Aqua-Lator® DDM Direct Drive Mixers," 2001, pp. 4.

* cited by examiner

*Primary Examiner*—Chester T. Barry

(57) ABSTRACT

A system for treating wastewater includes a basin to contain wastewater, an aerator provided in the basin to mix the wastewater, and a cover system to cover a surface of the wastewater contained in the basin. The cover system includes a plurality of hollow bodies disposed on the surface of the wastewater. Each hollow body is adapted to float on the wastewater's surface, and has a contiguous outer surface and a sufficient mass so that 30 to 70 percent of the hollow body's outer surface is exposed to atmosphere during use. A method of treating wastewater is further disclosed.

14 Claims, 5 Drawing Sheets

METHOD FOR TREATING LIQUIDS

RELATED APPLICATIONS

This application is a divisional application of U.S. patent application Ser. No. 11/225,385, entitled "SYSTEM AND METHOD FOR TREATING WASTEWATER," filed on Sep. 13, 2005, which claims benefit of U.S. Provisional Application Ser. No. 60/609,423, entitled "SYSTEM AND METHOD FOR TREATING WASTEWATER," filed on Sep. 13, 2004, both of which are herein incorporated by reference in their entirety.

BACKGROUND OF THE INVENTION

1. Field of the Invention

The present invention relates generally to systems and methods for treating liquids, such as wastewater, and more particularly to a wastewater treatment system and method capable of treating and covering wastewater contained in a treatment basin.

2. Discussion of Related Art

In liquid treatment facilities, such as a wastewater treatment facility, it is well known to provide an aerator or a mixer to stimulate wastewater contained in a treatment basin. Mixers provide desired mixing of the wastewater so as to stimulate biological material used to treat the wastewater. Aerators also mix the wastewater and provide the added feature of introducing oxygen into the wastewater. For the purposes of this disclosure, the term "aerator" will be used to describe both aerators and mixers, and other types of aeration devices, such as aspirating aerators, unless otherwise described separately. In such facilities, it is further well known to cover the wastewater basin to prevent birds from nesting in the wastewater basin, to reduce heat loss, to reduce odors emanating from the basin, and to control the growth of algae within the basin by reducing sunlight.

One issue in designing a cover is that the cover must be compatible with the aerator, which can be designed to float on the water's surface. Surface aerators have several advantages over submerged aerators, such as lower installed cost, quick and simple installation, and virtually no routine maintenance requirements. One disadvantage with such surface aerators is that cooling caused by operating in winter conditions, for example, can reduce the biological treatment efficiency. Another disadvantage is that surface aerators are often used in lagoon treatment processes having a large surface area, which can result in a long hydraulic retention time. This long retention time can lead to algae blooms, which in turn can lead to effluent TSS, $BOD_5$, and turbidity. Thus, it is somewhat important to control or eliminate algae to optimize the overall treatment performance of the wastewater treatment system.

There is presently available a fiberglass cover that is an optional attachment for surface aerators to reduce heat loss as well as to control excessive misting and odors caused by the aerator spray. Specifically, this type of cover serves as a dome provided directly over the surface aerator to control mist and water flow resulting from the aerator water discharge. Such a cover, while effective in controlling the mist, is less effective in reducing heat loss in a basin having a long retention time. In addition, a domed cover does not provide algae control, nor does it prevent birds from nesting in the basin.

There are also commercially available polyester fabric covers that are effective in shading the surface. One disadvantage associated with such fabric covers is that the seams, which attach the fabric sheets to one another, are susceptible to degradation. Another disadvantage is that adequate space must be provided around the aerator to prevent the fabric cover from being ingested by the aerator during its operation.

Another water surface "cover" is provided in the form of hollow plastic balls that cover 90% of the water's surface. In one known application, each ball is fabricated from black, ultra violet-stabilized, high density polyethylene. The ball is 100 millimeters (four inches) in diameter, has a wall thickness of less than 1 mm, and weighs 40 grams. Each ball can be formed with an opening that is closed by a plug. This construction enables the ball to be filled with water for ballast and thereby prevent the ball from being blown out of the basin during windy conditions. One problem associated with this construction is that the balls, due to the susceptibility of the plugs becoming dislodged, will leak over time. This results in the sinking of the balls, and the inevitable result of being ingested by the aerator, thereby causing in damage to the aerator. Balls formed without a plug are extremely light and subject to being blown out of the basin.

SUMMARY OF THE INVENTION

One aspect of the invention is directed to a system for treating liquids comprising a basin to contain liquid, and a cover system to cover a surface of the liquid contained in the basin. The cover system comprises a plurality of hollow bodies disposed on the surface of the liquid. Each hollow body is adapted to float on the liquid's surface, and has a contiguous outer surface and a sufficient mass so that 30 to 70 percent of the hollow body's outer surface is exposed to atmosphere during use.

The hollow body has a wall with a thickness between 1 mm and 15 mm, and is spherical in shape. In one embodiment, the hollow body has a diameter of about 100 mm and a mass between 40 grams and 300 grams, and preferably a mass between 200 grams and 240 grams. The hollow body is fabricated from polyethylene, which has a density of 0.948 $gm/cm^3$.

The system may further comprise an aerator provided in the basin to mix the liquid. In one embodiment, the liquid is wastewater.

Another aspect of the invention is directed to a method of treating wastewater comprising: (a) depositing wastewater within a wastewater treatment basin; (b) treating the wastewater with a biologically active material; and (c) covering a surface of the wastewater with a plurality of hollow bodies disposed on the surface of the wastewater. Each hollow body is adapted to float on the wastewater's surface, and has a contiguous outer surface and a sufficient mass so that 30 to 70 percent of the hollow body's outer surface is exposed to atmosphere during use. The method may further comprise mixing the wastewater with an apparatus disposed within the basin.

DESCRIPTION OF THE DRAWINGS

For a better understanding of the present invention, reference is made to the figures which are incorporated herein by reference and in which.

DETAILED DESCRIPTION OF THE INVENTION

Figure 1:
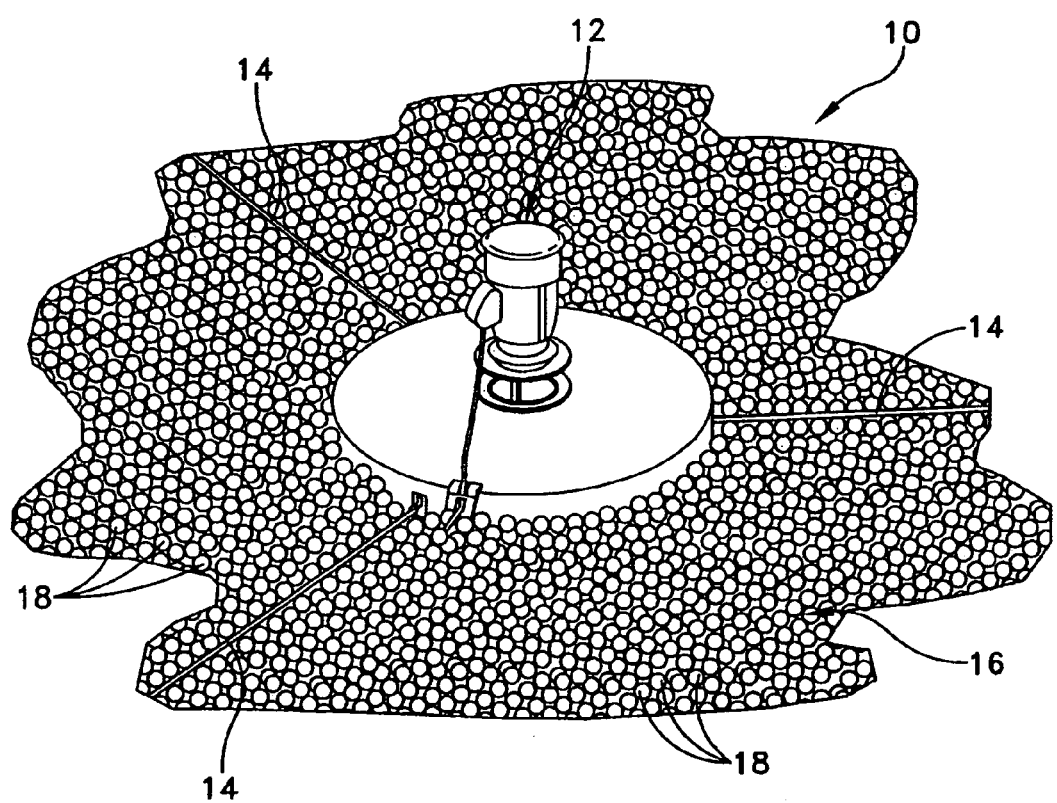
FIG. 1 is a perspective view illustrating a system for treating liquids, such as wastewater, in accordance with one embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

One embodiment of the present invention is directed to a liquid treatment system and, more particularly, to a cover system employing a plurality of hollow spheres used to cover liquid, such as wastewater, during treatment. In such a treatment system, liquid, such as wastewater, is delivered to a space designed to contain the liquid. In one embodiment, the space is a basin or lagoon, for example, which is designed to contain liquid without any seepage into the environment. The basin may embody a naturally existing configuration, a man-made structure, or a combination of both, which is designed to contain liquid. It should be understood that the basin may embody any structure designed to contain liquid and still fall within the scope of the present invention.

In such a wastewater treatment system, an aerobic biological treatment system uses biomass to digest or degrade biodegradable materials in the influent stream. In operation, the treatment system typically decontaminates the influent contained within a wastewater treatment basin in a treatment cycle composed of a series of steps or periods. These treatment steps may vary according to a number of factors including, for example, influent flow rate, pollutant concentration and type, biomass concentration and diversity or type, ambient temperature, air flow, and other conditions, such as downstream capacity and availability.

The various embodiments and aspects of the invention will be better understood from the following definitions. As used herein, "influent" defines a stream of "wastewater" or "water," from a municipal or industrial source, having pollutants or "biodegradable material," inorganic or organic compounds capable of being decomposed by bacteria, flowing into the wastewater treatment system. A "wastewater treatment apparatus" is a system, typically a biological treatment system, having a "biomass," a population of bacterial micro-organisms or a diversity of types of bacteria, used to digest biodegradable material. Notably, the biomass requires an environment that provides the proper conditions for growth including nutrients. It should be understood that the cover system disclosed herein may be employed in any type of system designed to treat a liquid, and the term "wastewater" is used to designate any type of liquid requiring treatment.

"Digestion" refers to the biodegradation process where the biomass consumes the biodegradable material and reduces the biodegradable material to solid material which can be flocculated and removed by gravity sedimentation or settling into sludge. For example, in the biodegradation process, bacteria may use enzymes to hydrolyze or breakdown complex organic compounds, such as carbohydrates, into simple organic molecules, like carbon dioxide and water. During digestion, the bacteria may also reproduce, which results in additional biomass. The settling process may also produce a substantially clear liquid layer above the settled sludge layer. Notably, the sludge may contain digested inorganic and organic materials and biomass.

Moreover, digestion may be under aerobic conditions wherein the biomass and the wastewater liquid mixes with oxygen. Alternatively, digestion may be under "anoxic" or anaerobic conditions, where no oxygen or air is added to the reaction. The latter is used to facilitate biodegradation of nitrogen containing compounds, such as nitrates.

Figure 2:
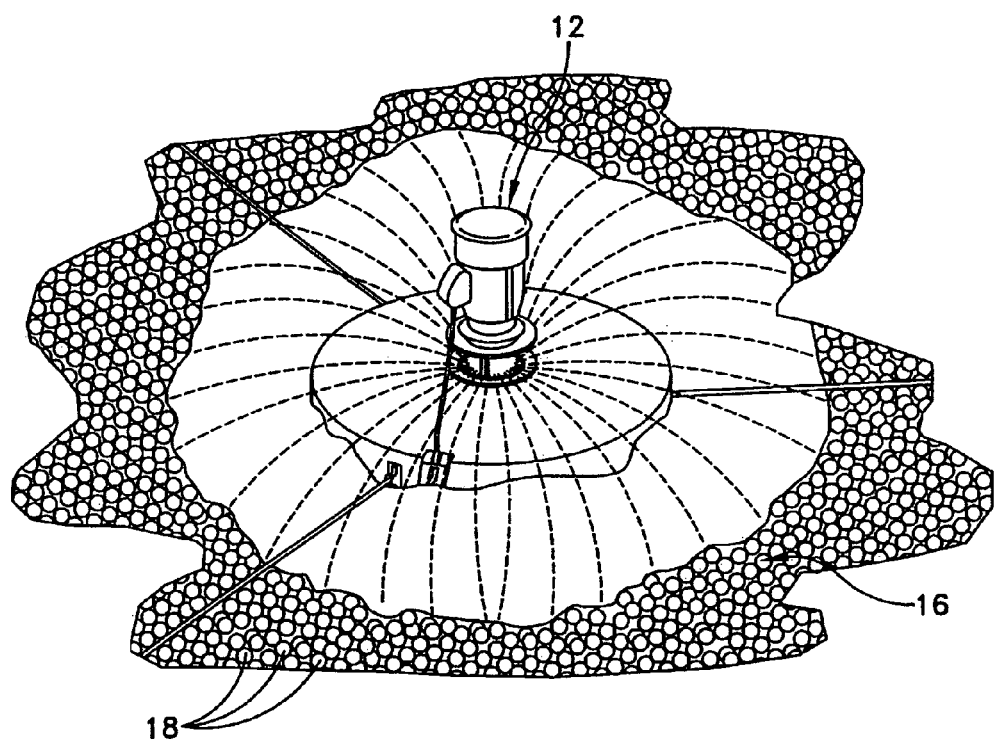
FIG. 2 is a perspective view illustrating the system of FIG. 1, with an aerator of the system operating to spray and mix liquids.

Turning now to the drawings, and more particularly to FIGS. 1 and 2, there is generally indicated at 10 a system of at least one embodiment of the present invention for treating wastewater. As shown, wastewater is contained within a basin or lagoon, which is designed to contain the wastewater without any seepage of the wastewater into the environment. Provided within the basin is an aerator, generally indicated at 12, which floats on the surface of the wastewater. As will be described below, the aerator 12, depending upon whether it is a mixer or an aerator, stimulates the movement of the wastewater within the basin. The aerator 12 is held in place within the basin by cables, each indicated at 14. Other devices, such as posts, can be employed to hold the aerator 12 in place. The system 10 further includes a cover system generally indicated at 16, in accordance with an embodiment of the present invention, to cover the surface of the wastewater.

Figure 3:
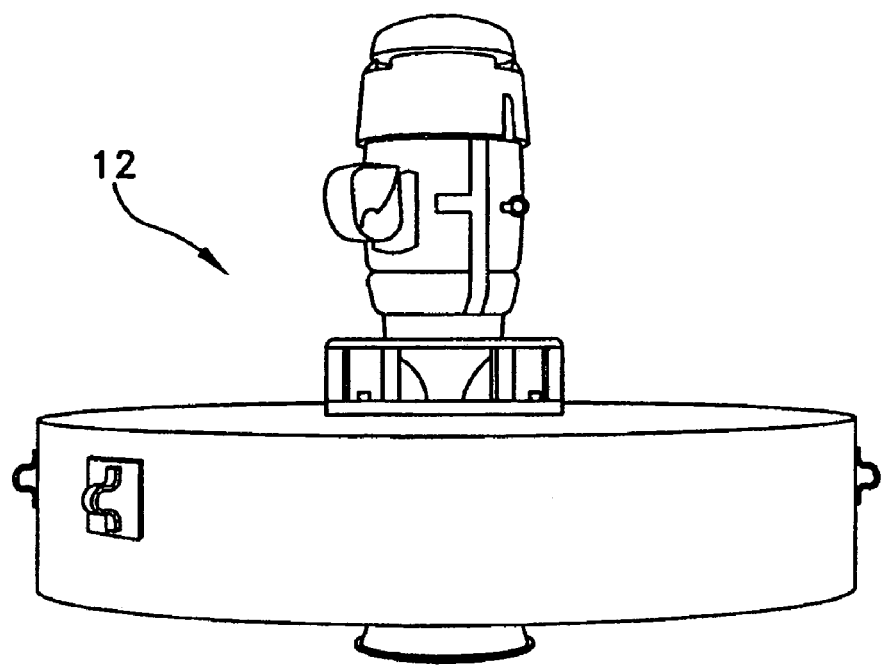
FIG. 3 is an elevational view showing an aerator in accordance with an embodiment of the present invention.

Referring to FIGS. 2 and 3, the aerator 12 can be chosen from any of the well-known aerators. For example, the aerator may be of the type that mixes and sprays wastewater to introduce oxygen into the wastewater. This type of aerator 12 is illustrated in FIG. 3 and is offered by U.S. Filter Aerator Products of Roscoe, Ill., the assignee of the present invention, under the brand name AQUA-LATOR®. As shown in FIG. 2, during operation, the aerator 12 sprays wastewater into atmosphere for positively introducing oxygen into the wastewater.

Figure 4:
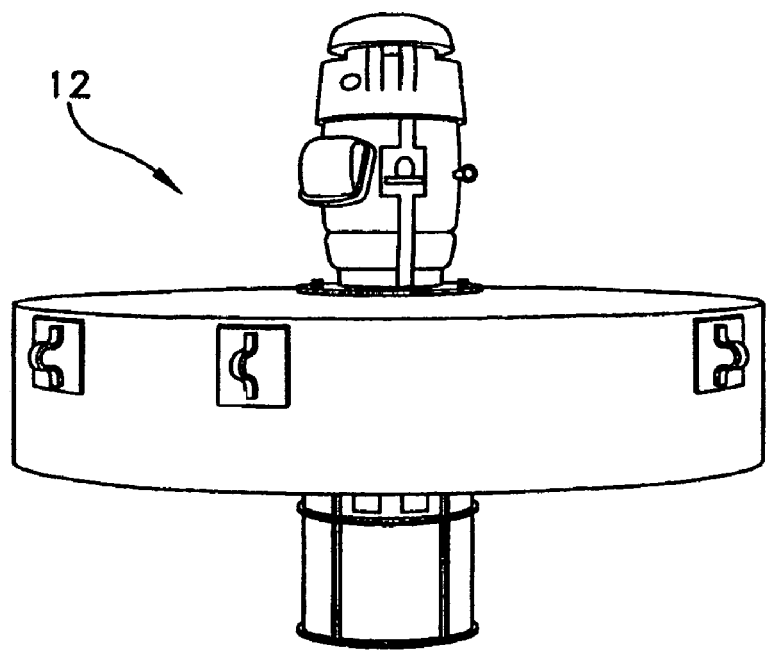
FIG. 4 is an elevational view showing a mixer in accordance with an embodiment of the present invention.

Referring to FIG. 4, the aerator may alternatively be of the type that only mixes the wastewater underneath the surface of the wastewater. This type of aerator 12 is illustrated in FIG. 4 and is also offered by U.S. Filter Aerator Products under the AQUA-LATOR® brand name. The mixer-type aerator is incapable of spraying wastewater and therefore does not positively introducing oxygen into the wastewater as with the sprayer-type aerator. The aerator may also be of the type that is submerged.

Turning back to FIGS. 1 and 2, the cover system 16 includes a plurality of hollow, spherically-shaped bodies or balls, each indicated at 18. Any suitably shaped body can be chosen by the person of ordinary skill in the art, given the benefit of this disclosure; however, spherically-shaped balls are easier to manufacture and operate more efficiently, as will be described in detail below. The number of balls 18 depends on the size of the surface area of the wastewater to be treated. The balls 18 are adapted to float on the wastewater's surface so as to provide a uniform layer across the surface of the wastewater. This configuration reduces the penetration of sunlight by approximately 90%, which significantly reduces the photosynthesis of algae. During operation of the aerator (FIG. 2), the balls 18 are pushed away from the aerator 12 and stacked up by the spray of the aerator 12.

Figure 5:
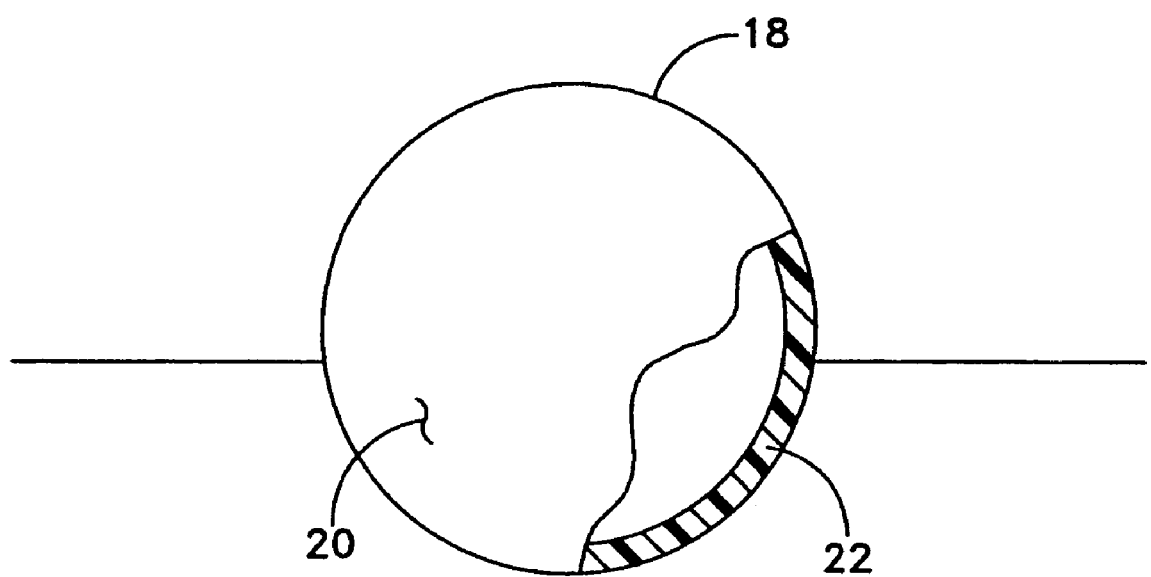
FIG. 5 is an enlarged, partial cross-sectional view of a hollow sphere used in the system for treating liquids in accordance with an embodiment of the present invention.

With reference to FIG. 5, each ball 18 is formed with a contiguous outer surface 20 having no openings provided therein as with the prior art balls described above. Preferably, the ball 18 is fabricated from a suitable polymeric material, such as black, ultra violate-stabilized polyethylene. The density of the polyethylene depends on the mass requirement of the ball. For example, for lighter balls, a high density polyethylene (HDPE) is used due to a relatively thin wall thickness. More particularly, a thin walled ball requires a higher strength material to withstand environmental elements. Conversely, heavier balls would require a medium density polyethylene with a greater wall thickness, as will be described in greater detail below. Other materials can also be used and are dependent on the specific application. The weight of the ball 18 can vary according to application requirements. For example, heavier balls may be required for use near airports to prevent the balls from being blown out of the basin by jet aircraft exhaust or strong winds.

Each ball 18 is approximately 100 millimeters (mm) in diameter, and is fabricated from any suitable process, such as an injection mold process. It should be understood that a person of ordinary skill in the art, given the benefit of this disclosure, could employ a ball having a different diameter. Preferably, the ball can be between 25 mm and 150 mm in diameter. The body of the ball 18 is defined by a wall 22, which has a thickness between approximately 1 mm and 15 mm, preferably a thickness between 7 mm and 10 mm, and most preferably a thickness of about 8.74 mm. A wall thickness of 8.74 mm provides sufficient mass so that 30 to 70 percent of the ball's outer surface 20 is exposed to atmosphere above the surface of the wastewater during use as illustrated in FIG. 5. Preferably, 40 to 60 percent of the balls outer surface is exposed, and most preferably 50 to 60 percent of the ball's outer surface is exposed. The preferred material, medium density polyethylene, has a density of 0.948 grams/centimeter$^3$ (gm/cm$^3$). Thus, for a ball having a wall thickness of 8.74 mm, the mass of the ball is approximately 220 grams. It should be understood, however, that a ball having a mass between 40 and 300 grams, and preferably between 200 and 240 grams, is contemplated herein so long as the ball retains a portion of its outer surface in the wastewater.

It should be noted that in one embodiment the ball 18 disclosed herein has a contiguous outer surface without an opening and plug as required by the prior art plastic ball described above. The thick wall construction of the ball 18 provides the necessary ballast so as to rest firmly within the wastewater during use. And, since the ball 18 does not have an opening and plug, it is not susceptible to sinking. Moreover, the air inside the ball 18 and the low thermal conductivity of the polyethylene provide a thermal insulation barrier that reduces heat loss from the wastewater.

Furthermore, the cover system 16 does not restrict the installation and movement of the floating aerator 12, and allows normal access of the surface of the wastewater for routine sampling. The balls 18 are adapted to rise and fall with changes in the wastewater level, and maintain complete surface coverage at all levels. Specifically, as the wastewater level drops, the balls automatically stack up into two or more layers, and then re-cover the surface in a single layer as the water rises. The increased surface area associated with sloped basins is accommodated by adding a sufficient quantity of balls to cover the wastewater surface at the maximum level.

In another aspect of the present invention, the system 10 including aerator 12 and cover system 16 are used to provide biological treatment of an airport de-icing runoff basin and, at the same time, prevent birds from nesting near the runoff basin by creating an illusion of a solid surface over the entire surface of the water. This application of the present invention is considered a viable wildlife control technique to assist in preventing the potentially catastrophic effect of a bird entering an aircraft's jet engine.

Figure 6:
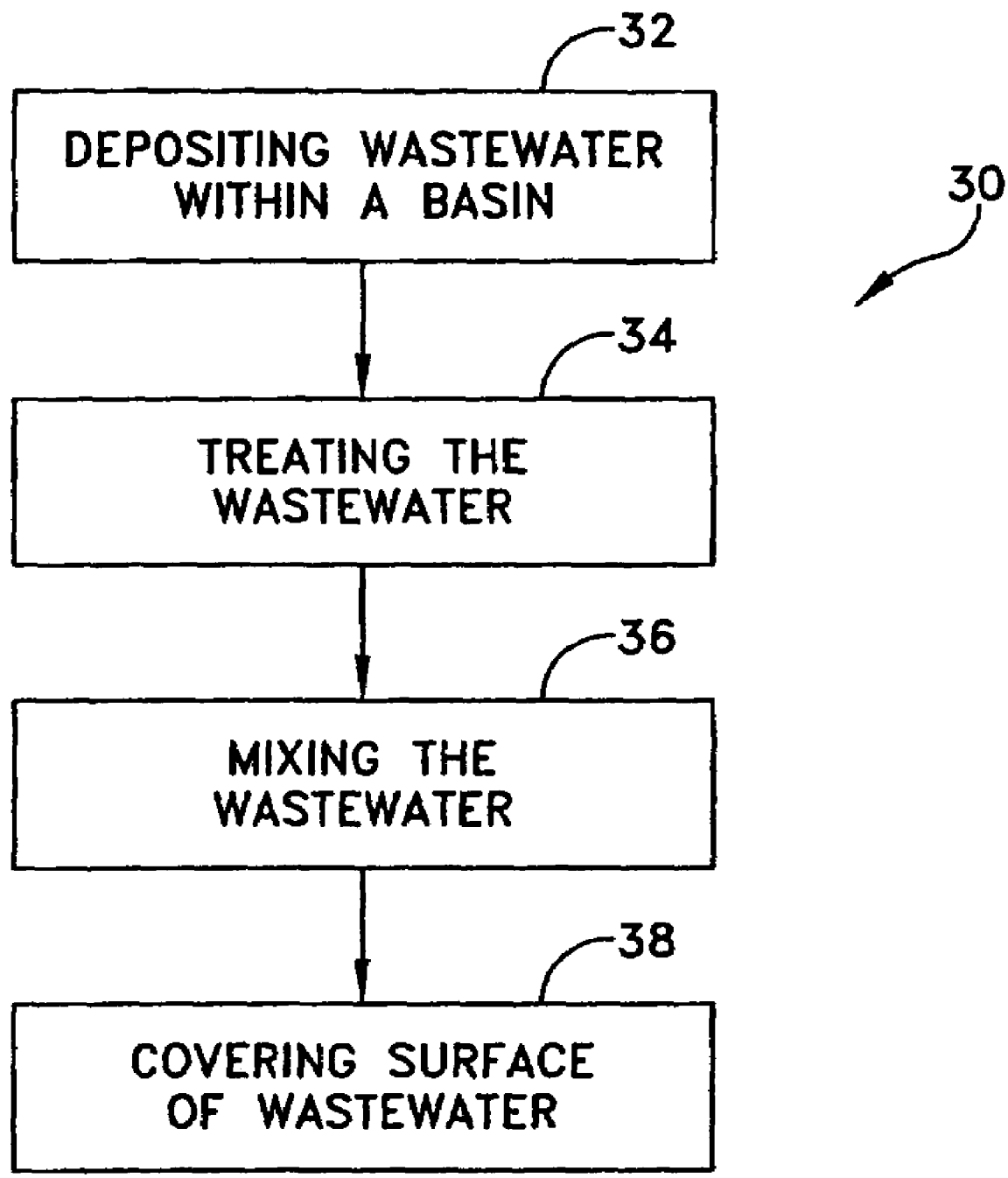
FIG. 6 is a flow diagram showing a method of treating liquids in accordance with an embodiment of the invention.

Referring to FIG. 6, in another aspect of the instant invention, a method of treating wastewater, generally indicated at 30, is further disclosed. In one embodiment, the method comprises: (a) depositing wastewater within a wastewater treatment basin at 32; (b) treating the wastewater with a biologically active material at 34; (c) mixing the wastewater with an apparatus (e.g., aerator 12) disposed within the basin at 36; and (d) covering a surface of the wastewater with a plurality of hollow bodies (e.g., balls 18) disposed on the surface of the wastewater at 38. The hollow balls 18 are simply deposited into the basin wherein the wastewater flow generated by the aerator 12 allows the balls to settle in a uniform layer that covers the entire surface of the wastewater, provided a sufficient number of balls is deposited. The balls 18 are pushed away and stacked up by the spray generated by the aerator 12 such that the aeration efficiency and mixing performance are not negatively affected. When the aerator 12 is turned off, the balls 18 automatically re-cover the entire water surface provided a sufficient amount of balls is provided in the basin.

It should be understood that the teachings of the present invention could be applied to other related applications, such as storm water collection ponds and to any other open water basin applications.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of treating wastewater comprising:
   depositing wastewater within a wastewater treatment basin;
   treating the wastewater with a biologically active material; and
   covering a surface of the wastewater with a plurality of hollow bodies disposed on the surface of the wastewater, each hollow body being adapted to float on the wastewater's surface, each hollow body having a contiguous outer surface and a mass greater than 200 grams so that 30 to 70 percent of the hollow body's outer surface is exposed to atmosphere during use.

2. The method of claim 1, further comprising mixing the wastewater with an apparatus disposed within the basin.

3. A method of treating wastewater comprising:
   depositing wastewater within a wastewater treatment basin;
   treating the wastewater with a biologically active material;
   covering a surface of the wastewater with a plurality of hollow bodies disposed on the surface of the wastewater, each hollow body being adapted to float on the wastewater's surface and having a mass greater than 200 grams; and mixing the wastewater with an apparatus disposed within the basin.

4. The method of claim 3, wherein each hollow body has a wall with a thickness between 1 mm and 15 mm.

5. The method of claim 3, wherein each hollow body is spherical in shape.

6. The method of claim 5, wherein each hollow body has a diameter of about 100 mm.

7. The method of claim 3, wherein each hollow body has a mass between 200 grams and 300 grams.

8. The method of claim 3, wherein each hollow body has a mass between 200 grams and 240 grams.

9. The method of claim 3, wherein each hollow body is spherical in shape and fabricated from polyethylene, each hollow body having a mass between 200 and 300 grams.

10. The method of claim 9, wherein each hollow body has a density of 0.948 gm/cm$^3$.

11. The method of claim 3, wherein the apparatus comprises a mixer provided in the basin to mix the wastewater.

12. The method of claim 3, wherein the apparatus comprises an aerator provided in the basin to mix the wastewater.

13. The method of claim 3, wherein the hollow body has a diameter between 25 mm and 150 mm.

14. The method of claim 3, wherein each hollow body has a contiguous outer surface and a sufficient mass so that 30 to 70 percent of the hollow body's outer surface is exposed to atmosphere during use.

* * * * *